United States Patent [19]

Stack

[11] Patent Number: 5,198,492
[45] Date of Patent: Mar. 30, 1993

[54] LOW VISCOSITY, FAST CURING BINDER FOR CELLULOSE

[75] Inventor: Dennis P. Stack, Santa Ana, Calif.

[73] Assignee: Rohn and Haas Company, Philadelphia, Pa.

[21] Appl. No.: 590,289

[22] Filed: Sep. 28, 1990

Related U.S. Application Data

[62] Division of Ser. No. 310,245, Feb. 13, 1989.

[51] Int. Cl.$^5$ ............................................. C08J 3/03
[52] U.S. Cl. .................................. 524/501; 524/555; 524/552; 524/558; 524/560
[58] Field of Search .............. 526/318.25, 318.44, 526/307.5, 501; 524/555, 558, 560, 556

[56] References Cited

U.S. PATENT DOCUMENTS

| | | | |
|---|---|---|---|
| 3,137,589 | 6/1964 | Reinhard et al. | 117/140 |
| 3,594,337 | 7/1971 | Shea | 260/17.4 |
| 3,616,166 | 10/1971 | Kelley | 161/148 |
| 3,766,112 | 10/1973 | Blackford | 260/28.5 |
| 4,289,676 | 9/1981 | Czauderna et al. | 206/29.6 |
| 4,406,660 | 9/1983 | Beiner et al. | 526/317 |
| 4,455,341 | 6/1984 | Fink et al. | 428/265 |
| 4,743,498 | 5/1988 | Kedrowski | 428/288 |

FOREIGN PATENT DOCUMENTS 0224736  10/1987  European Pat. Off.
44-22749  9/1969  Japan.

*Primary Examiner*—Joseph L. Schofer
*Assistant Examiner*—Jeffrey T. Smith
*Attorney, Agent, or Firm*—James G. Vouros

[57] ABSTRACT

Low viscosity, fast curing binders for nonwoven cellulosic materials comprise an aqueous dispersion of discrete particles of a highly functionalized emulsion copolymer resulting from the copolymerization of a water insoluble olefinic non-ionic organic compound, a water soluble olefinic carboxylate compound and a water soluble olefinic hydroxy ester or a water soluble olefinic amide or a mixture of hydroxy ester and amide. The emulsion copolymer dispersion is admixed with a latex to provide a binder having a relatively low viscosity and capable of reaching about 80 percent of fully cured wet tensile strength in 8 seconds or less.

64 Claims, No Drawings

LOW VISCOSITY, FAST CURING BINDER FOR CELLULOSE

This application is a division of application Ser. No. 310,245, filed Feb. 13, 1989, which is now pending.

FIELD OF THE INVENTION

This invention relates to polymeric binders for cellulose and more particularly to fast curing compositions based on a low viscosity highly functionalized emulsion copolymer admixed with a polymeric latex, which is especially useful where low formaldehyde emitting applications are involved.

BACKGROUND OF THE INVENTION

During the past few years there has been a substantial growth in the production of high-strength paper and cloth products having a nonwoven, randomly-oriented structure, bonded with a polymeric resin binder. Such products are finding wide use as high-strength, high-absorbency materials for disposable items such as consumer and industrial wipes or towels, diapers, surgical packs and gowns, industrial work clothing and feminine hygiene products. They are also used for durable products such as carpet and rug backings, apparel interlinings, automotive components and home furnishings, and for civil engineering materials such as road underlays. There are several ways to apply a binder to these materials, including spraying, print binding, and foam application. Further, depending on the end use, various ingredients such as catalysts, cross-linkers, surfactants, thickeners, dyes, and flame retardant salts may also be incorporated into the binder.

In the high-speed, high-volume manufacture of cellulosic products such as wet wipes, an important binder property is a fast cure rate; i.e., the finished product must reach substantially full tensile strength in a very short time after binder application so that production rates are not unduly slowed down. In these products, such a property is usually obtained by using a binder which is either self cross-linkable or by incorporating an external cross-linker into the binder formulation. When this is done, the cross-linker apparently not only interacts with the binder monomers but with the hydroxyl groups on the cellulose fibers to quickly form very strong bonds.

At present, there are a number of available binder formulations which meet this requirement. However, these materials are typified by incorporating one or more constituents which, over some period of time, will emit formaldehyde in amounts which may be sufficient to cause skin and respiratory irritation in many people, particularly children. Most recently, several of the leading manufacturers of nonwoven cellulosic products have expressed a desire to replace such binders with products offering equivalent levels of performance in cellulose but without the emission of formaldehyde. Although a number of ostensibly "zero" formaldehyde or "0 CH₂O" cellulose binders have been proposed, they have either not been truly "0" in formaldehyde content or have not shown sufficiently fast cure rates to be acceptable in high-volume production applications.

One approach to a fast curing, "zero" formaldehyde binder for nonwoven cellulosic materials utilizes a binder comprising a solution copolymer formed by reacting a mixture of two or more water soluble olefinically unsaturated organic comonomers. The solution copolymer is admixed with a non-formaldehyde emitting latex to produce a final composition which is essentially free of formaldehyde and which, when cured on nonwoven cellulosic material, will achieve about 80 percent of fully cured wet tensile strength in 8 seconds or less.

While this approach results in providing zero formaldehyde emitting binders which are capable of fast curing, solution copolymers raise the viscosity and cause thickening of the binders in which they are incorporated. In certain applications, it is necessary to maintain the viscosity of the binder at a relatively low level in order to assure adequate penetration of the binder into the nonwoven substrate.

BRIEF DESCRIPTION OF THE INVENTION

In accordance with the present invention, a low viscosity, fast curing, "zero" formaldehyde binder for nonwoven cellulosic materials is provided. The binder comprises an aqueous dispersion of discrete particles of a highly functionalized emulsion copolymer formed by reacting a mixture of comonomers comprising (1) one or more water insoluble polymerizable olefinically unsaturated non-ionic organic compounds; (2) one or more water soluble olefinically unsaturated organic compounds having at least one carboxylate group therein; and (3) one or more water soluble olefinically unsaturated carboxylic acid hydroxy esters or water soluble olefinically unsaturated amides, or a mixture thereof; the mixture of comonomers usually being dispersed by means of a suitable surfactant. The binder also preferably comprises a non-formaldehyde emitting latex which is admixed with the aqueous copolymer dispersion to produce a final composition which is essentially free of formaldehyde, which, when cured on nonwoven cellulosic material, will achieve about 80 percent of fully cured wet tensile strength in 8 seconds or less, and which has a viscosity of less than about 600 cps at 30 percent solids content at a pH value of up to about pH 6 and a viscosity of less than about 1200 cps at 35 percent solids content at a pH value of up to about pH 6.

DETAILED DESCRIPTION OF THE INVENTION

The present invention comprises a low viscosity, fast curing, zero formaldehyde binder composition for nonwoven cellulosic materials. The binder comprises a polymeric composition formed by the emulsion polymerization of a mixture containing at least one water insoluble monomer and at least two water soluble monomers.

The water insoluble monomer comprises one or more water insoluble non-ionic organic compounds having at least one olefinically unsaturated linkage, said compounds having the general formula:

$$R_1-C=C-R_4 \atop \phantom{R_1-}R_2\phantom{=}R_3 \qquad (a)$$

wherein $R_1$, $R_2$, $R_3$ and $R_4$ are independently hydrogen, halogen, nitro, amino, and organic radicals. Normally, the number of all the carbon atoms in compound (a) is no greater than 30.

The first of the water soluble comonomers, all of which are highly functionalized organic compounds, comprises one or more water soluble organic compounds having at least one olefinically unsaturated linkage with at least one carboxylate group, said compounds having the general formula:

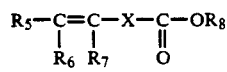 (b)

wherein $R_5$, $R_6$ and $R_7$ are independently hydrogen, halogen, nitro, amino, and organic radicals; $R_8$ is hydrogen or an organic radical, usually containing no more than about 10 carbon atoms; and X is a covalent bond or an organic radical, usually of no more than about 10 carbon atoms. Normally, the number of all the carbon atoms in compound (b) is no greater than 30.

The other water soluble comonomers are either water soluble hydroxy esters or water soluble amides.

The hydroxy ester comonomers comprise one or more water soluble compounds having the general formula:

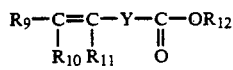 (c)

wherein $R_9$, $R_{10}$ and $R_{11}$ are independently selected from hydrogen, halogen, nitro, amino, and organic radicals, usually of no more than 10 carbon atoms; $R_{12}$ is an organic radical having at least 2, and usually no more than 10, carbon atoms, with at least one of $R_9$, $R_{10}$, $R_{11}$, and $R_{12}$ being an organic radical having a hydroxyl substituent thereon, said hydroxyl substituent being at least 2 carbon atoms away from the carboxylate group. Where one or more of $R_9$, $R_{10}$, and $R_{11}$ are organic radicals having a hydroxyl substituent, $R_{12}$ is preferably an unsubstituted hydrocarbyl radical, usually of no more than 10 carbon atoms. Y is a covalent bond or an organic radical, usually of no more than about 10 carbon atoms.

The amide comonomers comprise one or more water soluble compounds having the general formula:

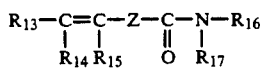 (d)

wherein $R_{13}$, $R_{14}$, and $R_{15}$ are independently selected from nitro, hydrogen, halogen, amino, and organic radicals; $R_{16}$ and $R_{17}$ are hydrogen or organic radicals having no more than 6 carbon atoms; and Z is a covalent bond or an organic radical, usually of no more than about 10 carbon atoms.

The term "organic" radical, when used herein, broadly refers to any carbon-containing radical. Such radicals may be cyclic or acyclic, may have straight or branched chains, and can contain one or more hetero atoms such as sulfur, nitrogen, oxygen, phosphorus, and the like. Further, they may be substituted with one or more substituents such as thio, hydroxy, nitro, amino, cyano, carboxyl and halogen. In addition to aliphatic chains, such radicals may contain aryl groups, including arylalkyl and alkylaryl groups, and cycloalkyl groups, including alkyl-substituted cycloalkyl and cycloalkyl-substituted alkyl groups, with such groups, if desired, being substituted with any of the substituents listed herein above. When cyclic groups are present, whether aromatic or nonaromatic, it is preferred that they have only one ring. Preferred organic radicals for compounds (b), (c), and (d) are, in general, free of olefinic and alkynyl linkages.

The term "water soluble" shall denote a solubility in an amount of at least 1 g/100 ml. measured at a temperature of 20° C. in deionized water. Preferably, the water soluble comonomers are soluble in water to the extent of at least 5 g/100 ml. The water insoluble monomers preferably are soluble to the extent of no more than about 0.7 9/100 ml. A solubility of no more than about 0.2 g/100 ml. is especially preferred.

In compound (a), it is further preferred that $R_1$, $R_2$ and $R_3$ be hydrogen, aryl, alkylaryl, arylalkyl, cycloalkyl or straight or branched chain alkyl groups which have no more than 10 carbon atoms and that $R_4$ be hydrogen, aryl, alkylaryl, arylalkyl, cycloalkyl or straight or branched alkyl groups which have no more than 10 carbon atoms or

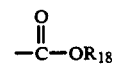

wherein $R_{18}$ is aryl, alkylaryl, arylalkyl, cycloalkyl, or straight or branched chain alkyl or polyalkylene ether having no more than 21 carbon atoms. In a more preferred form, compound (a) is a styrene derivative wherein $R_1$ and $R_2$ are hydrogen, $R_3$ is hydrogen or methyl and $R_4$ is phenyl or substituted phenyl or an ester of acrylic or methacrylic acid wherein $R_1$ and $R_2$ are hydrogen, $R_3$ is hydrogen or methyl and $R_4$ is

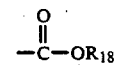

wherein $R_{18}$ is a straight or branched chain alkyl or polyalkylene ether group having no more than 21 carbon atoms. In the most preferred form of all, compound (a) is styrene, butyl acrylate, or 2-ethylhexyl acrylate. Compound (a) can also be an ester formed by reacting acrylic acid with an alkyl phenoxypoly(ethyleneoxy)ethanol such as IGEPAL CO-420, IGEPAL CA-430, IGEPAL CO-420 or IGEPAL CO-430, available from GAF Corporation, New York, N.Y.

In compound (b), it is further preferred that $R_5$, $R_6$, and $R_7$ be hydrogen or unsubstituted cycloalkyl or unsubstituted, straight or branched chain alkyl groups which have no more than 7 carbon atoms, with the exception that at least one of $R_5$, $R_6$, and $R_7$ may be a nitrile or bear a cyano group or be or bear a carboxylate group

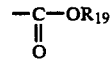

wherein $R_{19}$ is hydrogen or an organic radical, usually having no more than about 10 carbon atoms. More preferably, $R_5$, $R_6$, and $R_7$, except for the group being the nitrile or carboxylate group or bearing the cyano or carboxylate group are hydrogen or unsubstituted, straight or branched chain alkyl groups having no more than 5 carbon atoms. When X is an organic radical, it preferably has no more than 6 carbon atoms and is an unsubstituted, branched or unbranched alkyl or unsubstituted cycloalkyl radical and when an alkyl group, is most preferably unbranched.

In the most preferred form of all, compound (b) is a dicarboxylic acid, wherein $R_5$, $R_6$, and $R_7$ are all independently hydrogen, carboxylate groups, or ethyl or methyl groups, either unsubstituted or substituted with a carboxylate group, provided that $R_5$, $R_6$ and $R_7$ comprise, in total, only one carboxylate group. Most preferred for $R_8$ and $R_{19}$ are hydrogen and unsubstituted alkyl or unsubstituted cycloalkyl groups, provided at least one of $R_8$ and $R_{19}$ is hydrogen. Most preferred for X is a covalent bond.

In particular regard to the most preferred embodiment of compound (b), it is still more preferred that, except for the carboxylate groups, the remainder of the compound be unsubstituted; i.e., consist of only carbon and hydrogen atoms, and that the maximum number of carbon atoms in the compound be 30; with $R_5$ and $R_6$ combined having no more than 9; with $R_8$ and $R_{19}$ having no more than 7 carbon atoms, provided that at least one of $R_8$ and $R_{19}$ is hydrogen. In the very most preferred embodiment, each side of the olefinic linkage has no more than about 5 carbon atoms and at least one of $R_5$, $R_6$, and $R_7$ is or contains the carboxylate group

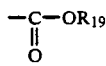

and both of $R_8$ and $R_{19}$ are hydrogen.

Suitable polymerizable, water-soluble monomers for compound (b) according to the above most preferred description include monoolefinically unsaturated diacids, such as tetrahydrophthalic acid, methylenesuccinic acid (itaconic acid), the cis- and trans- forms of butenedioic acid (maleic and fumaric acids), and both the cis- and trans- forms (where such exist) of the diacids resulting when one or more of the hydrogen atoms on the carbon chains of maleic/fumaric acid or itaconic acid is replaced with a methyl or ethyl group, as well as the $C_1$ to $C_{10}$ and, preferably, $C_1$ to $C_5$ semi-esters of these acids. Of these, itaconic acid and maleic acid are most preferred.

For compound (c), it is preferred that $R_9$, $R_{10}$, and $R_{11}$ be free of hydroxyl and carboxylate substituents and, even more preferably, that they be hydrogen or unsubstituted cycloalkyl or unsubstituted, straight or branched chain alkyl groups which have no more than 7 carbon atoms. Most preferably, $R_9$, $R_{10}$, and $R_{11}$ are hydrogen or unsubstituted, straight or branched chain alkyl groups having no more than 5 carbon atoms. In the very most preferred form of all, $R_9$, $R_{10}$, and $R_{11}$ are all independently ethyl, methyl, or hydrogen. $R_{12}$ is also preferably free of carboxylate groups and is most preferably an alkyl or cycloalkyl group, substituted at least 2 carbon atoms away from the carboxylate group with a hydroxyl group. When Y is an organic radical, it is preferably a branched or unbranched, unsubstituted alkyl or unsubstituted cycloalkyl group with no more than about 6 carbon atoms and, when an alkyl group, is preferably unbranched. However, most preferred for Y is a covalent bond.

Preferred polymerizable, water-soluble, unsaturated compounds according to the above most preferred description for compound (c) are the hydroxy alkyl and hydroxy cycloalkyl esters of acrylic and methacrylic acids, and while the esterifying moiety must have at least 2 carbon atoms, it preferably has no more than about 6, and, more preferably, no more than about 4 carbon atoms. Of the hydroxy alkyl and hydroxy cycloalkyl esters of acrylic and methacrylic acids meeting these criteria, 2-hydroxyethyl acrylate and hydroxypropyl methacrylate are most preferred.

For compound (d)), it is preferred that $R_{13}$, $R_{14}$, and $R_{15}$ be free of carboxylate substituents and, even more preferably, that they be hydrogen or unsubstituted cycloalkyl or unsubstituted, straight or branched chain alkyl groups which have no more than 7 carbon atoms. Most preferably, $R_{13}$, $R_{14}$, and $R_{15}$ are hydrogen or straight or branched chain, unsubstituted alkyl groups having no more than 5 carbon atoms. In the very most preferred form of all, $R_{13}$, $R_{14}$, and $R_{15}$ are all independently ethyl, methyl, or hydrogen. Preferred for $R_{16}$ and $R_{17}$ are hydrogen or unsubstituted, branched or unbranched alkyl or unsubstituted cycloalkyl groups each having no more than 6 carbon atoms, provided that at least one of $R_{16}$ and $R_{17}$ is hydrogen. When Z is an organic radical, it is preferably an unsubstituted, branched or unbranched alkyl or cycloalkyl group with no more than about 6 carbon atoms and, when an alkyl group, is more preferably unbranched. However, most preferred for Z is a covalent bond.

Preferred polymerizable water-soluble, unsaturated compounds according to the above most preferred description for formula (d) are the primary and secondary amides of acrylic and methacrylic acid, with $R_{16}$ being hydrogen and $R_{17}$ being either hydrogen, methyl, or ethyl. Of the amides meeting these criteria, acrylamide is most preferred.

The copolymerization reaction is conducted with between about 10 parts and about 60 parts of compound (a) per hundred parts total monomer (phm), the balance being comprised of compounds (b) and (c), compounds (b) and (d) or compounds (b), (c) and (d). In a preferred embodiment of the present invention, the comonomeric mixture preferably comprises between about 20 and about 50 phm but, more preferably, between about 30 and about 40 phm of compound (a). The preferred dicarboxylic acid monomers of compound (b), the preferred hydroxy ester monomers of compound (c), when present, and the preferred amide monomers of compound (d), when present, are preferably present in substantially equal quantities.

Suitable copolymers of the above described comonomers can be prepared by free-radical initiated emulsion polymerization methods, using either thermal or redox techniques. Further, the reaction may be conducted by batch, semi-batch or continuous procedures, which are well known for use in conventional polymerization reactions. Free-radical polymerization involves emulsifying the ingredients in water by gradually adding the monomers to be polymerized and a suitable surfactant or surfactants simultaneously to an aqueous reaction medium with agitation at rates proportionate to the respective percentage of each monomer in the finished copolymer and initiating and continuing the polymerization with a suitable reaction catalyst. Optionally, one or more of the comonomers and surfactant(s) can be added disproportionately throughout the polymerization so that the polymer formed during the initial stages of polymerization will have a composition and/or a molecular weight differing from that formed during the intermediate and later stages of the same polymerization reaction.

The purpose of the surfactant is to initiate particle formation and to provide physical stability of the dispersion. Illustrative of anionic surfactants, which are preferred, are alkali metal or ammonium salts of alkyl, aryl, or alkylaryl sulfonates, sulfates, phosphates, phosphonates, etc. Examples include sodium lauryl sulfate, sodium octylphenol glycol ether sulfate, sodium dodecylbenzene sulfonate, sodium lauryl diglycol sulfate, ammonium tritertiarybutylphenol penta- and octaglycol sulfates, dioctyl sodium sulfosuccinate, alphaolefin sulfonates and sulfonated biphenyl ethers. Numerous other examples of suitable surfactants are disclosed, for example, in U.S. Pat. No. 2,600,831, the disclosure of which is incorporated herein by reference in its entirety.

Illustrative water soluble, free-radical initiators are hydrogen peroxide, sodium persulfate, potassium persulfate and ammonium persulfate, and combinations of the above with a reducing agent activator, such as a sulfite, more specifically an alkali metabisulfite, hyposulfite or hydrosulfite, glucose, ascorbic acid, erythorbic acid, etc. to form a "redox" system. Normally the amount of initiator used ranges from about 0.1 percent to about 5 percent, by weight, based on the monomer charge. In a redox system, a corresponding range (about 0.1 to about 5 percent) of reducing agent is also normally used.

The reaction, once started, is continued, with agitation, at a temperature sufficient to maintain an adequate reaction rate until most, or all, of the comonomers are consumed and until the reaction medium reaches a polymer solids concentration between about 1 percent and about 50 percent, by weight. Normally, the solids content will be kept above 10 percent to minimize drying problems when the binder is applied to cellulosic materials.

At this point, the reaction product will typically comprise an aqueous dispersion of discrete particles of a very highly functionalized emulsion copolymer, i.e. an emulsion polymer characterized by having a multiplicity of hydrophilic functional groups pendant from the polymer backbone. The dispersed particles will have a size range of about 100 nm to about 2100 nm as measured by a Coulter Model N-4 Submicron Particle Size Analyzer. The dispersion, which is milky white in appearance, normally will have a Brookfield viscosity in the range of about 5 cps to about 100 cps.

In the present invention, reaction temperatures in the range of about 10° C. to about 100° C. will yield satisfactory polymeric compositions. When persulfate systems are used, the temperature of the dispersion is normally in the range of about 60° C. to about 100° C., while, in redox systems, the temperature is normally in the range of about 10° C. to about 70° C., and preferably about 30° C. to about 60° C.

The binder composition of the present invention is formed when the aqueous dispersion of discrete particles of highly functionalized emulsion copolymer described above, in an amount of about 2 percent to about 30 percent, by weight, more preferably about 3 percent to about 15 percent and most preferably about 5 percent to about 12 percent, is admixed with a fast-curing polymeric latex.

A number of commercially available latexes can be used with the aqueous dispersion of discrete particles of highly functionalized emulsion copolymer in accordance with the present invention. These include styrene-butadiene resin (SBR) copolymers containing between about 50 percent and about 70 percent styrene, carboxylated SBR copolymers (i.e., an SBR composition in which between about 0.2 percent and about 10 percent of one or more ethylenically unsaturated mono- or dicarboxylic acid monomers, such as acrylic acid, methacrylic acid, itaconic acid, maleic acid or fumaric acid, is copolymerized therewith), vinyl acetate/acrylate copolymers (which may also have up to about 5 percent of one or more ethylenically unsaturated mono- or dicarboxylic acid monomers added thereto) and all-acrylate copolymer latexes.

Several rheological properties of water base latexes, such as those described above, are of particular importance when they are to be applied to the formulation of binders for cellulosic materials. For example, in many cases, control of latex particle size and particle size distribution is critical to the realization of desirable physical properties in the finished latex. Further, control of latex viscosity is an important factor due to its influence on polymer distribution, filler loading, and fiber wetting. While all of the polymer systems listed above may be polymerized using conventional emulsion polymerization techniques, this is frequently done in the presence of an added seed polymer to optimize these factors. In addition, while such latexes may have either a unimodal or polymodal particle size distribution, they are typically unimodal with a particle size in the range between about 100 nm and about 400 nm and a viscosity in the range between about 20 cps and about 2000 cps, at a solids content in the range of about 25 percent to about 65 percent.

In order to impart the fast-curing properties needed for cellulose binder compositions, the latexes may be formulated with an amount of a cross-linker or other reactive monomer being added during the formulation thereof. The most effective prior art cross-linkers commonly used with these latexes are known formaldehyde emitters. Methoxymethyl melamine, for example, is used as a post-added cross-linker. N-methylolacrylamide, isobutoxylethyl acrylamide (IBMA) and glyoxal bisacrylamide are used as copolymerizable cross-linkers.

However, it has been found that in the production of these latexes, the formaldehyde emitting cross-linking materials can be entirely replaced with between about 0.5 percent and about 15 percent, by weight, of one or more low or non-formaldehyde emitting, polymerizable reactive monomers such as methyl acryloamidoglycolate methyl ether (MAGME). MAGME has been found to be especially effective in producing fast-curing, "zero" formaldehyde latexes. As used herein, the terms "non-formaldehyde" and "'zero' formaldehyde," when used in relation to the binders of the present invention, shall be taken to mean that a free formaldehyde level of 10 ppm or less is observed in the fully cured compositions. Such a level is close to the minimum level of detectability for most analytical methods and well below the level known to cause respiratory and skin irritation problems in people. The term "fully-cured" shall mean the wet tensile strength observed after curing for 180 seconds at 149° C.

After admixing one of the above described "zero" formaldehyde latexes with the aqueous dispersion of discrete particles of highly functionalized emulsion copolymer, the admixture is diluted with sufficient deionized water to produce a total nonvolatile solids content between about 5 percent and about 40 percent and preferably between about 20 percent and about 35 percent. Depending on the particular application involved, other solids contents may be equally effective. When cured at about 190° C. for between about 4 seconds and about 8 seconds on a nonwoven cellulosic material, such binder compositions usually will have wet tensile strengths which are as much as 50 percent higher than those obtainable with the basic latex alone.

It is an advantage of the present invention that wet tensile strengths greater than are obtained with commercially available "zero" formaldehyde latexes can be realized by using the aqueous dispersion of discrete particles of highly functionalized emulsion copolymers of the present invention. Wet tensile strengths of up to about 80 percent of the wet tensile strengths of commercially available formaldehyde emitting latexes can be realized. A particular advantage is that the aqueous dispersions of this invention display desirable wet strength enhancement without producing a high viscosity binder composition as is the case with the previously mentioned solution polymers. For example, whereas a binder prepared from 95 parts of a "zero" formaldehyde styrene-butadiene latex and 5 parts of a solution polymer comprising copolymerized equal parts of itaconic acid, hydroxyethyl acrylate and acrylamide had viscosities in the range of 700 to 1800 cps at 30 percent total solids at pH 6 and over 2000 cps at 35 percent total solids content at pH 6, a binder prepared from 95 parts of a "zero" formaldehyde styrene-butadiene latex and 5 parts of an aqueous dispersion comprising a copolymerized mixture of 40 parts of butyl acrylate, 20 parts of itaconic acid, 20 parts of hydroxyethyl acrylate and 20 parts of acrylamide, in accordance with this invention, had viscosities less than about 600 cps at 30 percent total solids content at a pH value of up to about pH 6 and viscosities less than about 1200 cps at 35 percent total solids content at pH 6. Wet tensile strengths generally were equivalent to those of the binder utilizing a solution polymer.

Since many latexes provided commercially have pH values as low as about pH 2.0, the effect of pH on wet tensile strength and viscosity is of concern. The aqueous dispersions of the present invention normally have a pH within the range between about pH 1.0 to about pH 4.5. A blended binder composition of acidic latex and acidic dispersion will produce some degree of wet tensile strength. However, it has been found that neutralizing the binder composition with a base, such as sodium hydroxide, or, preferably, with ammonium hydroxide to a value of between about pH 4.0 and about pH 9.0, will produce final binder compositions having considerably improved wet tensile strength. On the other hand, as the pH value rises, the viscosity tends to increase. It is, therefore, usually advisable to provide a binder composition within a range of about pH 4 to about pH 6 in order to maximize the wet tensile strength while maintaining the viscosity within acceptable limits.

The invention is further described by the following examples which are illustrative of specific modes of practicing the invention and are not intended as limiting the scope of the invention as defined in the claims. All percentages are by weight unless otherwise specified.

EXAMPLE 1

A mixture comprised of 23.6 g acrylamide, 23.6 g butyl acrylate, 23.6 g 2-hydroxyethyl acrylate, 23.6 g itaconic acid and 4.7 g Siponate A-246L, an alpha-olefin sulfonate surfactant available from Alcolac, Inc., Baltimore, Md., was emulsified in 547 cc of deionized water and heated to a temperature of 75° C. A solution of initiator comprised of 0.9 g sodium persulfate dissolved in 13 cc of deionized water was added. The resulting emulsion was then heated at 75° C. for 3 hours with stirring, and the pH value adjusted to pH 4.0–5.0 with concentrated ammonium hydroxide. After cooling and filtering, 5 percent, by weight, of the resulting aqueous dispersion was admixed with a non-formaldehyde emitting carboxylated SBR copolymer latex comprised of 60 percent styrene, 40 percent butadiene and 1 percent itaconic acid with 2.0 to 5.0 percent methyl acryloamidoglycolate methyl ether (MAGME) as cross-linker. The resulting binder composition was then neutralized with concentrated ammonia to pH 6.0 and diluted with deionized water to a non-volatile solids content of 12 percent. For comparison purposes, a binder composition utilizing the same SBR latex and 5 percent of an aqueous solution polymer comprising 33 percent acrylamide, 33 percent 2-hydroxyethyl acrylate and 33 percent itaconic acid was prepared.

To determine the strength improvement of the binder of the present invention over the binder utlizing the solution polymer, sets of one-inch wide, nonwoven, randomly-oriented cellulose strips were padded in the binder compositions described above to obtain a binder add-on of approximately 10 percent. Padding is the process of dipping or saturating a substrate in a bath and squeezing off the excess liquid with nip rollers. The binder-containing strips were cured at 188° C. for periods of 4 seconds, 6 seconds, and 8 seconds, and then dipped in a 1 percent solution of Aerosol OT, a sodium octyl sulfosuccinate wetting agent available from American Cyanamid, Wayne, N.J. The wet tensile strengths were measured with the results shown in Table 1.

TABLE 1

| | Wet Tensile Strength (psi) | | |
| --- | --- | --- | --- |
| | 4 Sec. | 6 Sec. | 8 Sec. |
| Binder System | Cure | Cure | Cure |
| SBR + Solution Polymer | 4.5 | 6.6 | 6.6 |
| SBR + Dispersion of Emulsion Polymer (this invention) | 4.8 | 6.7 | 7.1 |

It can be seen that the wet tensile strengths obtained using the polymer dispersion of the present invention with a styrene-butadiene latex were higher than those obtained using a solution polymer with a styrene-butadiene latex.

The following example illustrates the preparation and properties of several alternative emulsion copolymer dispersions in accordance with the present invention.

EXAMPLE 2

The procedure of Example 1 was followed except that different mixtures of monomers and monomer concentrations and different surfactants were used. The formulations and physical properties of the emulsion polymer dispersions obtained are shown in Table 2, in which concentrations of ingredients are expressed as parts per hundred parts total monomer (phm).

TABLE 2

| Run No. | Surfactant[1] (phm) | Monomer[2] | | | | | | | | pH | Total Solids (%) | Part. Size (nm) | Visc. (cps) |
|---|---|---|---|---|---|---|---|---|---|---|---|---|---|
| | | S (phm) | BA (phm) | EHA (phm) | IA (phm) | MA (phm) | HEA (phm) | HPMA (phm) | AMD (phm) | | | | |
| 1 | 5.0 A | 0.0 | 40.0 | 0.0 | 30.0 | 0.0 | 30.0 | 0.0 | 0.0 | 1.7 | 13.1 | 157 | 7 |
| 2 | 5.0 A | 0.0 | 40.0 | 0.0 | 0.0 | 30.0 | 30.0 | 0.0 | 0.0 | 1.0 | 11.1 | 111 | 8 |
| 3 | 5.0 A | 40.0 | 0.0 | 0.0 | 20.0 | 0.0 | 20.0 | 0.0 | 20.0 | 3.0 | 13.5 | 847 | 8 |
| 4 | 5.0 A | 0.0 | 40.0 | 0.0 | 20.0 | 0.0 | 0.0 | 20.0 | 20.0 | 4.1 | 14.0 | 291 | 9 |
| 5 | 5.0 A | 0.0 | 40.0 | 0.0 | 20.0 | 0.0 | 20.0 | 0.0 | 20.0 | 3.4 | 15.2 | 166 | 10 |
| 6 | 5.0 A | 0.0 | 40.0 | 0.0 | 20.0 | 0.0 | 0.0 | 20.0[4] | 20.0 | 4.2 | 13.3 | 184 | 11 |
| 7 | 5.0 A | 30.0 | 0.0 | 0.0 | 23.2 | 0.0 | 23.2 | 0.0 | 23.2 | 3.1 | 14.2 | 563 | 12 |
| 8 | 5.0 A | 0.0 | 40.0 | 0.0 | 20.0 | 0.0 | 20.0 | 0.0 | 20.0 | 3.5 | 14.3 | 167 | 14 |
| 9 | 5.0 A | 0.0 | 40.0 | 0.0 | 20.0 | 0.0 | 20.0 | 0.0 | 20.0 | 4.0 | 14.4 | 180 | 15 |
| 10 | 5.0 A | 0.0 | 40.0 | 0.0 | 0.0 | 20.0 | 0.0 | 20.0 | 20.0 | 1.7 | 10.8 | 748 | 15 |
| 11 | 5.0 A | 0.0 | 40.0 | 0.0 | 0.0 | 20.0 | 0.0 | 20.0[4] | 20.0 | 1.9 | 15.0 | 2067 | 15 |
| 12 | 5.0 A | 0.0 | 35.0 | 0.0 | 21.7 | 0.0 | 21.7 | 0.0 | 21.7 | 3.9 | 14.4 | 191 | 16 |
| 13 | 5.0 A | 0.0 | 0.0 | 30.0 | 23.3 | 0.0 | 23.3 | 0.0 | 23.3 | 3.8 | 14.4 | 185 | 16 |
| 14 | 5.0 A | 0.0 | 30.0 | 0.0 | 23.3 | 0.0 | 23.3 | 0.0 | 23.3 | 3.9 | 14.4 | 201 | 17 |
| 15 | 5.0 A | 0.0 | 40.0 | 0.0 | 0.0 | 20.0 | 20.0 | 0.0 | 20.0 | 1.7 | 13.0 | 367 | 19 |
| 16 | 5.0 A | 0.0 | 0.0 | 20.0 | 26.7 | 0.0 | 26.7 | 0.0 | 26.7 | 4.0 | 14.1 | 190 | 19 |
| 17 | 5.0 A | 0.0 | 25.0 | 0.0 | 25.0 | 0.0 | 25.0 | 0.0 | 25.0 | 3.7 | 13.9 | 206 | 22 |
| 18 | 5.0 B | 0.0 | 30.0 | 0.0 | 23.2 | 0.0 | 23.3 | 0.0 | 23.3 | 3.8 | 14.4 | 251 | 27 |
| 19 | 5.0 A | 0.0 | 20.0 | 0.0 | 26.7 | 0.0 | 26.7 | 0.0 | 26.7 | 3.6 | 14.3 | 216 | 28 |

Notes for Table:
1. A = Dowfax 2A1, sulfonated biphenyl ether, available from Dow Chemical Co., Midland, Michigan B = Aerosol OT, dioctyl sodium sulfosuccinate, available from American Cyanamid Co., Wayne, New Jersey
2. S = Styrene, BA = butyl acrylate, EHA = 2-ethylhexyl acrylate, IA = itaconic acid, MA = maleic acid, HEA = 2-hydroxyethyl acrylate, HPMA = hydroxypropyl methacrylate, AMD = acrylamide
3. Two-stage batch reaction in which ⅓ of IA, HEA and AMD were added in second stage along with an additional 0.5 phm of activator.
4. Monomer added by delay addition over 1.5 hr period.

The following example illustrates the viscosities of binders prepared using the emulsion copolymer dispersions of the present invention compared to binders prepared using Cymel-303, a typical formaldehyde emitting cross-linker, binders prepared using MAGME, a typical non-formaldehyde emitting composition, and binders prepared using the solution copolymers described above.

EXAMPLE 3

Binders prepared using the formulations of Runs 7, 11 and 14 of Example 2 with a base SBR polymer latex comprised of 56.6 percent styrene, 37.7 percent butadiene, 4.7 percent methyl acryloamidoglycolate methyl ether (MAGME) and 0.9 percent itaconic acid were compared, with respect to viscosity, with a base SBR polymer latex; with a widely used reference commercial cellulose binder composition comprising a carboxylated SBR latex (53.4 percent butadiene, 43.7 percent styrene, 1.9 percent N-methylol acrylamide and 0.5 percent each of acrylamide and itaconic acid) cross-linked with 6 percent methoxymethyl melamine (Cymel-303), a known formaldehyde emitter; with a binder composition utilizing the base SBR polymer latex plus 5 percent of a solution polymer prepared from 33 percent acrylamide, 33 percent hydroxyethyl acrylamide and 33 percent itaconic acid. Each of the aqueous dispersions of emulsion polymers of Runs 7, 11 and 14 were admixed with the base SBR latex in a concentration of 5 percent. The viscosity of each of the binder systems was measured at 30 and 35 percent total solids content and at pH 4, pH 6, and pH 8. The results are shown in Table 3.

TABLE 3

| Binder System | Total Solids (%) | Viscosity as a Function of pH | | |
|---|---|---|---|---|
| | | pH 4 | pH 6 | pH 8 |
| Commerical carboxylated SBR latex cross-linked with Cymel-303 | 35 | — | — | 20 |
| | 30 | — | — | 10 |
| Carboxylated SBR latex | 35 | 2360 | 3605 | 3980 |

TABLE 3-continued

| Binder System | Total Solids (%) | Viscosity as a Function of pH | | |
|---|---|---|---|---|
| | | pH 4 | pH 6 | pH 8 |
| cross-linked with MAGME plus solution copolymer | 30 | 715 | 1630 | 1815 |
| Carboxylated SBR latex | 35 | 20 | 16 | — |
| cross-linked with MAGME plus aqueous emulsion copolymer dispersion of Run 3 | 30 | 17 | 11 | — |
| Carboxylated SBR latex | 35 | 116 | 171 | — |
| cross-linked with MAGME plus aqueous emulsion copolymer dispersion of Run 7 | 30 | 14 | 19 | — |
| Carboxylated SBR latex | 35 | 104 | 454 | 926 |
| cross-linked with MAGME plus aqueous emulsion copolymer dispersion of Run 9 | 30 | 30 | 39 | 174 |
| Carboxylated SBR latex | 35 | 29 | 900 | 1010 |
| cross-linked with MAGME plus aqueous emulsion copolymer dispersion of Run 13 | 30 | 15 | 434 | 503 |
| Carboxylated SBR latex | 35 | 260 | 1148 | 1280 |
| cross-linked with MAGME plus aqueous emulsion copolymer dispersion of Run 16 | 30 | 15 | 591 | 696 |

It should be noted that the binders utilizing the aqueous dispersions of emulsion copolymers of Runs 3, 7, 9, 13 and 16, representative aqueous emulsion copolymer dispersions of the present invention, have lower viscosities at all pH values than the corresponding binder systems utilizing a solution polymer.

The following example illustrates the wet tensile strength of the aqueous emulsion copolymers of the present invention compared to the binders described in Example 3 and to the base SBR latex.

EXAMPLE 4

Several of the binder systems described in Example 3 were tested for tensile strength after a 6 second cure at 188° C. and after a 180 second cure at 149° C. and compared to the base SBR latex. The results obtained are shown in Table 4.

TABLE 4

| Binder System | Wet Tensile Strength (psi) | |
| --- | --- | --- |
| | Cured 6 sec. at 188° C. | Cured 180 sec. at 149° C. |
| Commerical carboxylated SBR latex cross-linked with Cymel-303 | 10.0 | 9.8 |
| Carboxylated SBR latex cross-linked with MAGME | 5.2 | 6.2 |
| Carboxylated SBR latex cross-linked with MAGME plus solution copolymer | 7.6 | 9.5 |
| Carboxylated SBR latex cross-linked with MAGME plus aqueous emulsion copolymer dispersion of Run 9 | 6.2 | 7.2 |
| Carboxylated SBR latex cross-linked with MAGME plus aqueous emulsion copolymer dispersion of Run 13 | 7.4 | 8.0 |
| Carboxylated SBR latex cross-linked with MAGME plus aqueous emulsion copolymer dispersion of Run 16 | 6.6 | 7.6 |

EXAMPLE 5

Several other binder systems described in Example 3 were tested for tensile strength after a 6 second cure at 188° C., an 8 second cure at 188° C. and a 180 second cure at 149° C. and compared to the base SBR latex. The results obtained are shown in Table 5.

TABLE 5

| Binder System | Wet Tensile Strength (psi) | | |
| --- | --- | --- | --- |
| | Cured 6 sec. at 188° C. | Cured 8 sec. at 188° C. | Cured 180 sec. at 149° C. |
| Commercial carboxylated SBR latex cross-linked with Cymel-303 | 8.6 | 9.2 | 9.4 |
| Carboxylated SBR latex cross-linked with MAGME | 5.5 | 5.4 | 5.6 |
| Carboxylated SBR latex cross-linked with MAGME plus solution copolymer | 7.2 | 7.7 | 10.2 |
| Carboxylated SBR latex cross-linked with MAGME plus aqueous emulsion copolymer dispersion of Run 3 | 6.0 | 6.0 | 8.0 |
| Carboxylated SBR latex cross-linked with MAGME plus aqueous emulsion copolymer dispersion of Run 7 | 5.6 | 6.3 | 8.1 |

Note that the wet tensile strengths of the binder system utilizing the aqueous emulsion copolymer dispersion of the present invention are in all cases higher than those obtained using a carboxylated SBR latex cross-linked with MAGME. In addition, the results obtained are similar to the results obtained using a solution copolymer but with a viscosity (See Table 3) which is approximately one-third or less of the viscosity of the binder system utilizing the solution copolymer. Furthermore, the wet tensile strengths are as high as about 85 percent of the wet tensile strengths obtained using a commercial carboxylated SBR latex cross-linked with Cymel-303, a known formaldehyde emitter.

This invention may be embodied in other forms without departing from the spirit or essential characteristics thereof. For example, it is recognized that, while the description of the present invention and the preferred embodiments thereof are directed toward fast curing non-formaldehyde emitting binders, there may be applications wherein formaldehyde emission is not of concern and where the use of one or more formaldehyde emitting cross-linkers or other constituents may be necessary or desirable in the final binder composition. There may also be applications wherein a fast cure is not essential. Consequently, the present embodiments and examples are to be considered only as being illustrative and not restricted, with the scope of the invention being indicated by the appended claims. All embodiments which come within the scope and equivalency of the claims are, therefore, intended to be embraced therein.

I claim:

1. A fast curing binder for nonwoven cellulosic materials, said binder comprising an aqueous dispersion of discrete particles of a highly functionalized emulsion copolymer formed by the compolymerization of a mixture of comonomers comprising;
   (1) one or more water insoluble polymerizable olefinically unsaturated non-ionic organic compounds;
   (2) one or more water soluble olefinically unsaturated organic compounds having at least one carboxylate group therein; and
   (3) one or more water soluble olefinically unsaturated carboxylic acid hydroxy esters or water soluble olefinically unsaturated amides or a mixture thereof; said aqueous dispersion of discrete particles of highly functionalized emulsion copolymer being admixed with a latex selected from the group consisting of styrene-butadiene resin (SBR) copolymer latexes, vinyl acetate/acrylate copolymer latexes, and all-acrylate copolymer latexes.

2. A binder according to claim 1 wherein said latex is a "zero" formaldehyde SBR latex.

3. A binder according to claim 1 wherein said aqueous dispersion of discrete particles of highly functionalized emulsion copolymer is admixed in an amount of about 3 percent to about 15 percent, by weight, with a latex.

4. A binder according to claim 1 wherein said aqueous dispersion of discrete particles of highly functionalized emulsion copolymer is admixed in an amount of about 5 percent to about 12 percent, by weight, with a latex.

5. A binder according to claim 1 wherein the particle size of said discrete particles of highly functionalized emulsion copolymer is in the range of about 100 nm to about 2100 nm.

6. A binder according to claim 1 wherein the pH of said aqueous dispersion of discrete particles of highly functionalized emulsion copolymer is about pH 1.0 to about pH 4.5.

7. A binder according to claim 1 wherein the viscosity of said aqueous dispersion of discrete particles of highly functionalized emulsion copolymer is about 5 cps to about 100 cps at solids contents of about 1 percent to about 50 percent.

8. A binder according to claim 1 wherein the solids content of the admixture of emulsion copolymer and latex is about 5 percent to about 40 percent.

9. A binder according to claim 1 wherein the viscosity of the admixture of emulsion copolymer and latex is less than about 600 cps at a solids content of about 30 percent and a pH value of up to about pH 6.

10. A binder according to claim 1 wherein the viscosity of the admixture of emulsion copolymer and latex is less than about 1200 cps at a solids content of about 35 percent and a pH value of up to about pH 6.

11. A fast-curing binder for nonwoven cellulosic materials, said binder comprising an aqueous dispersion of discrete particles of a highly functionalized emulsion copolymer formed by the copolymerization of a mixture of comonomers comprising:

(1) one or more water insoluble polymerizable olefinically unsaturated non-ionic organic compounds having the general formula:

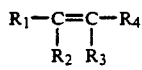

wherein $R_1$, $R_2$, $R_3$ and $R_4$ are independently selected from hydrogen, halogen, nitro, amino and organic radicals;

(2) one or more water soluble olefinically unsaturated organic compounds having at least one carboxylate group, said compounds having the general formula:

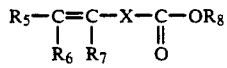

wherein $R_5$, $R_6$, and $R_7$ are independently selected from hydrogen, halogen, nitro, amino, and organic radicals; $R_8$ is hydrogen or an organic radicals; and X is an organic radical or a covalent bond; and (3) a member selected from the group consisting of one or more water soluble olefinically unsaturated carboxylic acid hydroxy esters of the general formula:

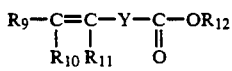

wherein $R_9$, $R_{10}$ and $R_{11}$ are independently selected from hydrogen, halogen, nitro, amino, and organic radicals; and $R_{12}$ is an organic radical having at least 2 carbon atoms, with at least one of $R_9$, $R_{10}$, $R_{11}$ and $R_{12}$ being an organic radical containing a hydroxyl substituent, said hydroxyl substituent being located on a carbon atom which is at least 2 carbon atoms away from the carboxylate group; and Y is an organic radical or a covalent bond; and one or more water soluble olefinically unsaturated amides having the general formula:

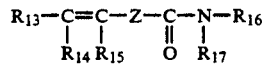

wherein $R_{13}$, $R_{14}$ and $R_{15}$ are independently selected from hydrogen, halogen, nitro, amino, and organic radicals; $R_{16}$ and $R_{17}$ are hydrogen or organic radicals; and Z is an organic radical or a covalent bond; and a mixture of said one or more water soluble olefinically unsaturated carboxylic acid hydroxy esters and said one or more water soluble olefinically unsaturated amides;

said aqueous dispersion of discrete particles of highly functionalized emulsion copolymer being admixed with a latex to produce said binder, the latex being selected from the group consisting of styrene-butadiene resin (SBR) copolymer latexes, vinyl acetate/acrylate copolymer latexes, and all-acrylate copolymer latexes.

12. A binder according to claim 11 wherein:
the total number of carbon atoms in the non-ionic organic compound does not exceed 30;
the total number of carbon atoms in the carboxylate group containing organic compound does not exceed 30, with the total number of carbon atoms in $R_8$ not exceeding 10 and the total number of carbon atoms in X not exceeding 10;
$R_9$, $R_{10}$ and $R_{11}$ are independently selected from hydrogen, halogen, nitro, amino and organic radicals containing no more than 10 carbon atoms; $R_{12}$ is an organic radical containing from 2 to 10 carbon atoms, and where one or more of $R_9$, $R_{10}$ and $R_{11}$ are organic radicals containing a hydroxyl substituent, $R_{12}$ is an unsubstituted hydrocarbyl radical containing no more than 10 carbon atoms; and the total number of carbon atoms in Y does not exceed 10; and
$R_{16}$ and $R_{17}$ are hydrogen or organic radicals containing no more than 6 carbon atoms; and the total number of carbon atoms in Z does not exceed 10.

13. A binder according to claim 11 wherein $R_1$, $R_2$ and $R_3$ are independently selected from hydrogen, aryl, alkylaryl, arylalkyl, cycloalkyl, straight chain alkyl groups and branched chain alkyl groups containing no more than 10 carbon atoms; and $R_4$ is selected from hydrogen, aryl, alkylaryl, arylalkyl, cycloalkyl, straight chain alkyl groups containing no more than 10 carbon atoms, branched chain alkyl groups containing no more than 10 carbon atoms, and the radical

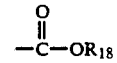

wherein $R_{18}$ is selected from aryl, alkylaryl, arylalkyl, cycloalkyl, straight chain alkyl groups containing no more than 21 carbon atoms, branched chain alkyl groups containing no more than 21 carbon atoms; and polyalkylene ether containing no more than 21 carbon atoms.

14. A binder according to claim 11 wherein $R_1$ and $R_2$ are hydrogen, $R_3$ is hydrogen or methyl, and $R_4$ is a member selected from the group consisting of phenyl, substituted phenyl, and the radical

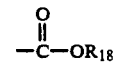

wherein $R_{18}$ is a member selected from the group consisting of straight chain alkyl groups, branched chain alkyl groups and alkyl phenoxypoly(ethyleneoxy) ethanol, $R_{18}$ containing no more than 21 carbon atoms.

15. A binder according to claim 11 wherein the non-ionic organic compound is styrene.

16. A binder according to claim 11 wherein the nonionic organic compound is butyl acrylate.

17. A binder according to claim 11 wherein the nonionic organic compound is 2-ethylhexyl acrylate.

18. A binder according to claim 11 wherein $R_5$, $R_6$ and $R_7$ are independently selected from the group consisting of hydrogen, unsubstituted cycloalkyl, unsubstituted straight chain alkyl groups containing no more than 7 carbon atoms, unsubstituted branched chain alkyl groups containing no more than 7 carbon atoms, cyano, cyanoalkyl and the radical

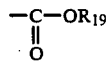

wherein $R_{19}$ is hydrogen or an organic radical containing no more than 10 carbon atoms.

19. A binder according to claim 11 wherein $R_5$, $R_6$ and $R_7$ are independently selected from the group consisting of hydrogen, unsubstituted straight chain alkyl groups containing no more than 5 carbon atoms, unsubstituted branched chain alkyl groups containing no more than 5 carbon atoms, and the radical

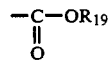

wherein $R_{19}$ is hydrogen or an organic radical containing no more than 10 carbon atoms; and X is a covalent bond or a member selected from the group consisting of unsubstituted cycloalkyl groups, unsubstituted straight chain alkyl groups containing no more than 6 carbon atoms, and unsubstituted branched chain alkyl groups containing no more than 6 carbon atoms.

20. A binder according to claim 11 wherein X is an unsubstituted straight chain alkyl group.

21. A binder according to claim 11 wherein $R_5$, $R_6$ and $R_7$ are independently selected from the group consisting of hydrogen, methyl, ethyl, carboxylate, methyl substituted with carboxylate and ethyl substituted with carboxylate, only one of $R_5$, $R_6$ and $R_7$ comprising a carboxylate group; $R_8$ selected from the group consisting of hydrogen, unsubstituted cycloalkyl and unsubstituted alkyl; and X is a covalent bond.

22. A binder according to claim 21 wherein $R_5$ and $R_6$ combined contain no more than 9 carbon atoms; and $R_8$ and $R_{19}$ contain no more than 7 carbon atoms.

23. A binder according to claim 11 wherein $R_5$ and $R_6$ combined contain no more than 4 carbon atoms; $R_7$ and X combined contain no more than 3 carbon atoms, at least one of $R_5$, $R_6$ and $R_7$ is carboxy or carboxyalkyl and $R_8$ is hydrogen.

24. A binder according to claim 11 wherein the carboxylate group containing organic compound is a monoolefinically unsaturated diacid.

25. A binder according to claim 24 wherein said diacid is itaconic acid.

26. A binder according to claim 24 wherein said diacid is maleic acid.

27. A binder according to claim 11 wherein the carboxylate group containing organic compound is a $C_1$ to $C_5$ semi-ester of a monoolefinically unsaturated diacid.

28. A binder according to claim 11 wherein $R_9$, $R_{10}$ and $R_{11}$ do not contain hydroxyl groups and $R_9$, $R_{10}$, $R_{11}$ and $R_{12}$ do not contain carboxylate groups.

29. A binder according to claim 11 wherein $R_9$, $R_{10}$ and $R_{11}$ are independently selected from the group consisting of hydrogen, unsubstituted cycloalkyl, unsubstituted straight chain alkyl containing no more than 7 carbon atoms, and unsubstituted branched chain alkyl containing no more than 7 carbon atoms.

30. A binder according to claim 11 wherein $R_9$, $R_{10}$ and $R_{11}$ are independently selected from the group consisting of hydrogen, unsubstituted straight chain alkyl containing no more than 5 carbon atoms and unsubstituted branched chain alkyl containing no more than 5 carbon atoms.

31. A binder according to claim 11 wherein $R_9$, $R_{10}$ and $R_{11}$ are independently selected from the group consisting of hydrogen, methyl and ethyl.

32. A binder according to claim 11 wherein $R_{12}$ is a member selected from the group consisting of alkyl substituted with a hydroxyl group at least 2 carbon atoms away from the carboxylate group, and cycloalkyl substituted with a hydroxyl group at least 2 carbon atoms away from the carboxylate group.

33. A binder according to claim 11 wherein Y is a member selected from the group consisting of straight chain alkyl containing no more than 6 carbon atoms, branched chain alkyl containing no more than 6 carbon atoms, and cycloalkyl containing no more than 6 carbon atoms.

34. A binder according to claim 11 wherein Y is a straight chain alkyl containing no more than 6 carbon atoms.

35. A binder according to claim 11 wherein Y is a covalent bond.

36. A binder according to claim 11 wherein the hydroxy ester is a member selected from the group consisting of hydroxy alkyl esters of acrylic acid, hydroxy cycloalkyl esters of acrylic acid, hydroxy alkyl esters of methacrylic acid, and hydroxy cycloalkyl esters of methacrylic acid, the hydroxy ester containing from 5 to 9 carbon atoms.

37. A binder according to claim 11 wherein the hydroxy ester is 2-hydroxyethyl acrylate.

38. A binder according to claim 11 wherein the hydroxy ester is hydroxypropyl methacrylate.

39. A binder according to claim 11 wherein $R_{13}$, $R_{14}$ and $R_{15}$ contain no carboxylate groups.

40. A binder according to claim 11 wherein $R_{13}$, $R_{14}$ and $R_{15}$ are selected from the group consisting of hydrogen, unsubstituted cycloalkyl containing no more than 7 carbon atoms, unsubstituted straight chain alkyl containing no more than 7 carbon atoms, and unsubstituted branched chain alkyl containing no more than 7 carbon atoms; $R_{16}$ and $R_{17}$ are selected from the group consisting of hydrogen, unsubstituted cycloalkyl containing no more than 6 carbon atoms, unsubstituted straight chain alkyl containing no more than 6 carbon atoms, and unsubstituted branched chain alkyl containing no more than 6 carbon atoms, at least one of $R_{16}$ and $R_{17}$ being hydrogen; and Z is a member selected from the group consisting of a covalent bond, unsubstituted cycloalkyl containing no more than 6 carbon atoms, unsubstituted straight chain alkyl containing no more than 6 carbon atoms and unsubstituted branched chain alkyl containing no more than 6 carbon atoms.

41. A binder according to claim 11 wherein $R_{13}$, $R_{14}$ and $R_{15}$ are independently selected from the group consisting of hydrogen, unsubstituted straight chain alkyl containing no more than 5 carbon atoms, and unsubstituted branched chain alkyl containing no more than 5 carbon atoms; and Z is a covalent bond or a straight chain alkyl containing no more than 6 carbon atoms.

42. A binder according to claim 11 wherein $R_{13}$, $R_{14}$ and $R_{15}$ are independently selected from the group consisting of hydrogen, methyl and ethyl.

43. A binder according to claim 11 wherein Z is a covalent bond.

44. A binder according to claim 11 wherein $R_{13}$, $R_{14}$ and $R_{16}$ are hydrogen, $R_{15}$ is hydrogen or methyl, $R_{17}$ is hydrogen, methyl or ethyl, and Z is a covalent bond.

45. A binder according to claim 11 wherein the amide is acrylamide.

46. A binder according to claim 11 wherein said mixture of comonomers comprises a member selected from the group consisting of butyl acrylate and 2-ethylhexyl acrylate, a member selected from the group consisting of maleic acid and itaconic acid, and a member selected from the group consisting of 2-hydroxyethyl acrylate and hydroxypropyl methacrylate.

47. A binder according to claim 11 wherein said mixture of comonomers comprises a member selected from the group consisting of butyl acrylate and 2-ethylhexyl acrylate, a member selected from the group consisting of maleic acid and itaconic acid, a member selected from the group consisting of 2-hydroxyethyl acrylate and hydroxypropyl methacrylate, and acrylamide.

48. A binder according to claim 11 wherein the styrene-butadiene copolymer latex comprises a carboxylated styrene-butadiene copolymer latex.

49. A binder according to claim 11 wherein said latex is formulated with between about 0.5 percent and about 15 percent, by weight, of a substantially non-formaldehyde emitting reactive monomer.

50. A binder according to claim 49 wherein said substantially non-formaldehyde emitting reactive monomer comprises methylacryloamidoglycolate methyl ether.

51. A binder according to claim 1 wherein said aqueous dispersion of discrete particles of highly functionalized emulsion copolymer is admixed, in an amount of about 2 percent to about 30 percent, by weight, with a latex.

52. A binder according to claim 11 wherein said aqueous dispersion of discrete particles of highly functionalized emulsion copolymer is admixed, in an amount of about 2 percent to about 30 percent, by weight, with a latex.

53. A binder according to claim 11 wherein said aqueous dispersion of discrete particles of highly functionalized emulsion copolymer is admixed, in an amount of about 3 percent to about 15 percent, by weight, with a latex.

54. A binder according to claim 11 wherein said aqueous dispersion of discrete particles of highly functionalized emulsion copolymer is admixed, in an amount of about 5 percent to about 12 percent, by weight, with a latex.

55. A binder according to claim 11 wherein said mixture of comonomers comprises a member selected from the group consisting of styrene, butyl acrylate and 2-ethylhexyl acrylate, a member selected from the group consisting of maleic acid and itaconic acid, and a member selected from the group consisting of 2-hydroxyethyl acrylate and hydroxypropyl methacrylate.

56. A binder according to claim 11 wherein said mixture of comonomers comprises a member selected from the group consisting of maleic acid and itaconic acid, and acrylamide.

57. A fast curing binder for nonwoven cellulosic materials, said binder comprising an aqueous dispersion of discrete particles of a highly functionalized emulsion copolymer formed by the copolymerization of a mixture of comonomers comprising;
   (1) one or more water insoluble polymerizable olefinically unsaturated non-ionic organic compounds;
   (2) one or more water soluble olefinically unsaturated organic compounds having at least one carboxylate group therein; and
   (3) one or more water soluble olefinically unsaturated carboxylic acid hydroxy esters; said aqueous dispersion of discrete particles of highly functionalized emulsion copolymer being admixed with a latex selected from the group consisting of styrene-butadiene resin (SBR) copolymer latexes, vinyl acetate/acrylate copolymer latexes, and all-acrylate copolymer latexes.

58. A fast curing binder for nonwoven cellulosic materials, said binder comprising an aqueous dispersion of discrete particles of a highly functionalized emulsion copolymer formed by the copolymerization of a mixture of comonomers comprising;
   (1) one or more water insoluble polymerizable olefinically unsaturated non-ionic organic compounds;
   (2) one or more water soluble olefinically unsaturated organic compounds having at least one carboxylate group therein; and
   (3) one or more water soluble olefinically unsaturated amides;
said aqueous dispersion of discrete particles of highly functionalized emulsion copolymer being admixed with a latex selected from the group consisting of styrene-butadiene resin (SBR) copolymer latexes, vinyl acetate/acrylate copolymer latexes, and all-acrylate copolymer latexes.

59. A fast-curing binder for nonwoven cellulosic materials, said binder comprising an aqueous dispersion of discrete particles of a highly functionalized emulsion copolymer formed by the copolymerization of a mixture of comonomers comprising:
   (1) one or more water insoluble polymerizable olefinically unsaturated non-ionic organic compounds having the general formula:

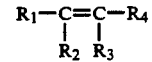

wherein $R_1$, $R_2$, $R_3$ and $R_4$ are independently selected from hydrogen, halogen, nitro, amino and organic radicals;
   (2) one or more water soluble olefinically unsaturated organic compounds having at least one carboxylate group, said compounds having the general formula:

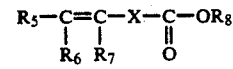

wherein $R_5$, $R_6$, and $R_7$ are independently selected from hydrogen, halogen, nitro, amino, and organic radicals; $R_8$ is hydrogen or an organic radical; and X is an organic radical or a covalent bond; and (3) one or more water soluble olefinically unsaturated carboxylic acid hydroxy esters of the general formula:

wherein $R_9$, $R_{10}$ and $R_{11}$ are independently selected from hydrogen, halogen, nitro, amino, and organic radicals; and $R_{12}$ is an organic radical having at least 2 carbon atoms, with at least one of $R_9$, $R_{10}$, $R_{11}$ and $R_{12}$ being an organic radical containing a hydroxyl substituent, said hydroxyl substituent being located on a carbon atom which is at least 2 carbon atoms away from the carboxylate group; and Y is an organic radical or a covalent bond; said aqueous dispersion of discrete particles of highly functionalized emulsion copolymer being admixed with a latex to produce said binder, the latex being selected from the group consisting of styrene-butadiene resin (SBR) copolymer latexes, vinyl acetate/acrylate copolymer latexes, and all-acrylate copolymer latexes.

60. A fast-curing binder for nonwoven cellulosic materials, said binder comprising an aqueous dispersion of discrete particles of a highly functionalized emulsion copolymer formed by the copolymerization of a mixture of comonomers comprising:
(1) one or more water insoluble polymerizable olefinically unsaturated non-ionic organic compounds having the general formula:

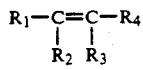

wherein $R_1$, $R_2$, $R_3$ and $R_4$ are independently selected from hydrogen, halogen, nitro, amino and organic radicals;
(2) one or more water soluble olefinically unsaturated organic compounds having at least one carboxylate group, said compounds having the general formula:

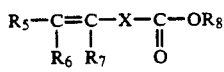

wherein $R_5$, $R_6$, and $R_7$ are independently selected from hydrogen, halogen, nitro, amino, and organic radicals; $R_8$ is hydrogen or an organic radical; and X is an organic radical or a covalent bond; and (3) one or more water soluble olefinically unsaturated amides having the general formula:

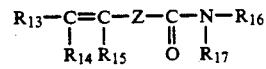

wherein $R_{13}$, $R_{14}$ and $R_{15}$ are independently selected from hydrogen, halogen, nitro, amino, and organic radicals; $R_{16}$ and $R_{17}$ are hydrogen or organic radicals; and Z is an organic radical or a covalent bond;
said aqueous dispersion of discrete particles of highly functionalized emulsion copolymer being admixed with a latex to produce said binder, the latex being selected from the group consisting of styrene-butadiene resin (SBR) copolymer latexes, vinyl acetate/acrylate copolymer latexes, and all-acrylate copolymer latexes.

61. A fast-curing binder for nonwoven cellulosic materials, said binder comprising an aqueous dispersion of discrete particles of a highly functionalized emulsion copolymer formed by the copolymerization of a mixture of comonomers comprising:
and 10 phm to about 60 phm of one or more water insoluble polymerizable olefinically unsaturated non-ionic organic compounds;
the balance of said mixture of comonomers comprising a mixture of
(a) one or more water soluble olefinically unsaturated organic compounds having at least one carboxylate group therein; and
(b) one or more water soluble olefinically unsaturated carboxylic acid hydroxy esters or one or more water soluble olefinically unsaturated amides or a mixture thereof;
said aqueous dispersion of discrete particles of highly functionalized emulsion copolymer being admixed with a latex to produce said binder, the latex being selected from the group consisting of styrene-butadiene resin (SBR) copolymer latexes, vinyl acetate/acrylate copolymer latexes, and all-acrylate copolymer latexes.

62. A binder according to claim 61 wherein said balance of said mixture of comonomers comprises a mixture of substantially equal quantities of the carboxylate group containing compound, the hydroxy ester, if present, and the amide, if present.

63. A binder according to claim 61 wherein said one or more non-ionic organic compounds is present in a quantity of about 20 phm to about 50 phm.

64. A binder according to claim 61 wherein said one or more non-ionic organic compounds is present in a quantity of about 30 phm to about 40 phm.

* * * * *